United States Patent

[11] 3,583,773

[72] Inventors Hans Steinbrenner
Stuttgart;
Hans-Jorg Florus, Goppingen; Horst Grossner, Geradstetten, Wurttemberg; Paul Schwerdt, Esslingen-Hegensberg, all of, Germany
[21] Appl. No. 817,922
[22] Filed Apr. 21, 1969
[45] Patented June 8, 1971
[73] Assignee Daimler-Benz Aktiengesellschaft
Stuttgart-Unterberkheim, Germany
[32] Priority Apr. 19, 1968
[33] Germany
[31] P 17 55 260.2

[54] INSTALLATION FOR THE CONTROL OF VALVES IN BRAKE LINES OF A MOTOR VEHICLE
17 Claims, 5 Drawing Figs.

[52] U.S. Cl. .................................................. 303/21, 303/20

[51] Int. Cl. .................................................. B60t 8/08
[50] Field of Search .................................................. 303/20, 21

[56] References Cited
UNITED STATES PATENTS

| | | | |
|---|---|---|---|
| 3,467,444 | 9/1969 | Leiber .......................... | 303/21 |
| 3,493,271 | 2/1970 | Douglas ........................ | 303/21(BB) |
| 3,498,682 | 3/1970 | Mueller et al ................. | 303/21(BB) |

*Primary Examiner*—Duane A. Reger
*Attorney*—Craig, Antonelli, Stewart & Hill

ABSTRACT: An installation for preventing the blocking of the wheel of a motor vehicle by controlling valves in the brake lines in such a manner that a respective wheel brake is rendered ineffective when the slippage exceeds a predetermined first value and the wheel brake is rendered effective again when the slippage has dropped below a second predetermined value lower than the first value.

INVENTORS
HANS STEINBRENNER
HANS-JORG FLORUS
HORST GROSSNER
PAUL SCHWERDT

PATENTED JUN 8 1971 3,583,773

INVENTORS
HANS STEINBRENNER
HANS-JORG FLORUS
HORST GROSSNER
PAUL SCHWERDT

BY

Craig, Antonelli, Stewart & Hill   ATTORNEYS

INSTALLATION FOR THE CONTROL OF VALVES IN BRAKE LINES OF A MOTOR VEHICLE

The present invention relates to an installation for the control of valves which are connected in the brake lines of a motor vehicle, with generators driven by associated wheels, which produce an output signal corresponding to the rotational speed and with diodes connected between the generators and amplifiers coordinated to each wheel.

Installations of this type serve to preclude the blocking of the brakes. If a wheel blocks, then, for the most part, several controls or control cycles are necessary until the desired condition is reestablished. Each control interplay or cycle, however, represents a consumption of brake fluid on the pressure side. Since the consumed or used-up brake medium is available again only after the braking operation, it is necessary to get along with as few control interplays or cycles as possible and to preclude in every case that the system starts to oscillate about an adjusted slippage.

It is the aim of the present invention to produce an installation which is capable to release the brake at a predetermined slip value $s_1$ and after reacceleration of the wheel to render operable or free the brake again at a second smaller slippage value $s_2$.

According to the present invention, the underlying problems are solved in that each generator is connected by way of a diode with one input of an associated differential amplifier, in that each generator is connected by way of another diode with a maximum voltage line, in that the other input of the differential amplifier is connected with a tap of a voltage divider whose one side is connected with the maximum voltage line and whose other side is connected with a reference potential, and in that a switch controlled by the differential amplifier is connected between the tap and the reference potential.

It is advantageous if the generator is a frequency generator in the output of which is connected a frequency-voltage converter. One avoids thereby that DC generators or AC generators have to be used, which are affected by variations in temperature and in connection with which it is difficult to manufacture identical generators.

Additionally, it is favorable if each generator is connected with a measuring installation measuring the change in slippage, if all slip-change measuring installations are connected with an AND circuit and if the output of the AND circuit is connected with a magnetic valve. As a result thereof, the brakes can also release or be disengaged if all four wheels of a vehicle, for example, block.

Accordingly, it is an object of the present invention to provide an installation for controlling the valves in the brake lines of a motor vehicle which avoids by simple and operationally reliable means the aforementioned shortcomings and drawbacks.

Another object of the present invention resides in an installation for the control of valves in brake lines of a motor vehicle which precludes any oscillation of the system about an adjusted slippage.

A further object of the present invention resides in a control installation for the valves arranged in brake lines of a motor vehicle which effectively precludes the blocking of the brakes without complicated and repeated control operations.

Still a further object of diagram of invention control installation in accordance installation of the type described above which avoids the need for generators difficult to manufacture in order to produce identical characteristics.

These and further objects, features and advantages of the present invention will become more obvious from the following description when taken in connection with the accompanying drawing which shows, for purposes of illustration only, several embodiments in accordance with the present invention, and wherein.

In the illustrated embodiment, the slippage is determined by a comparison of the velocity of a wheel with the velocity of the remaining wheels. It is thereby initially presupposed that at least one wheel has no blocking tendencies.

Figure 1:
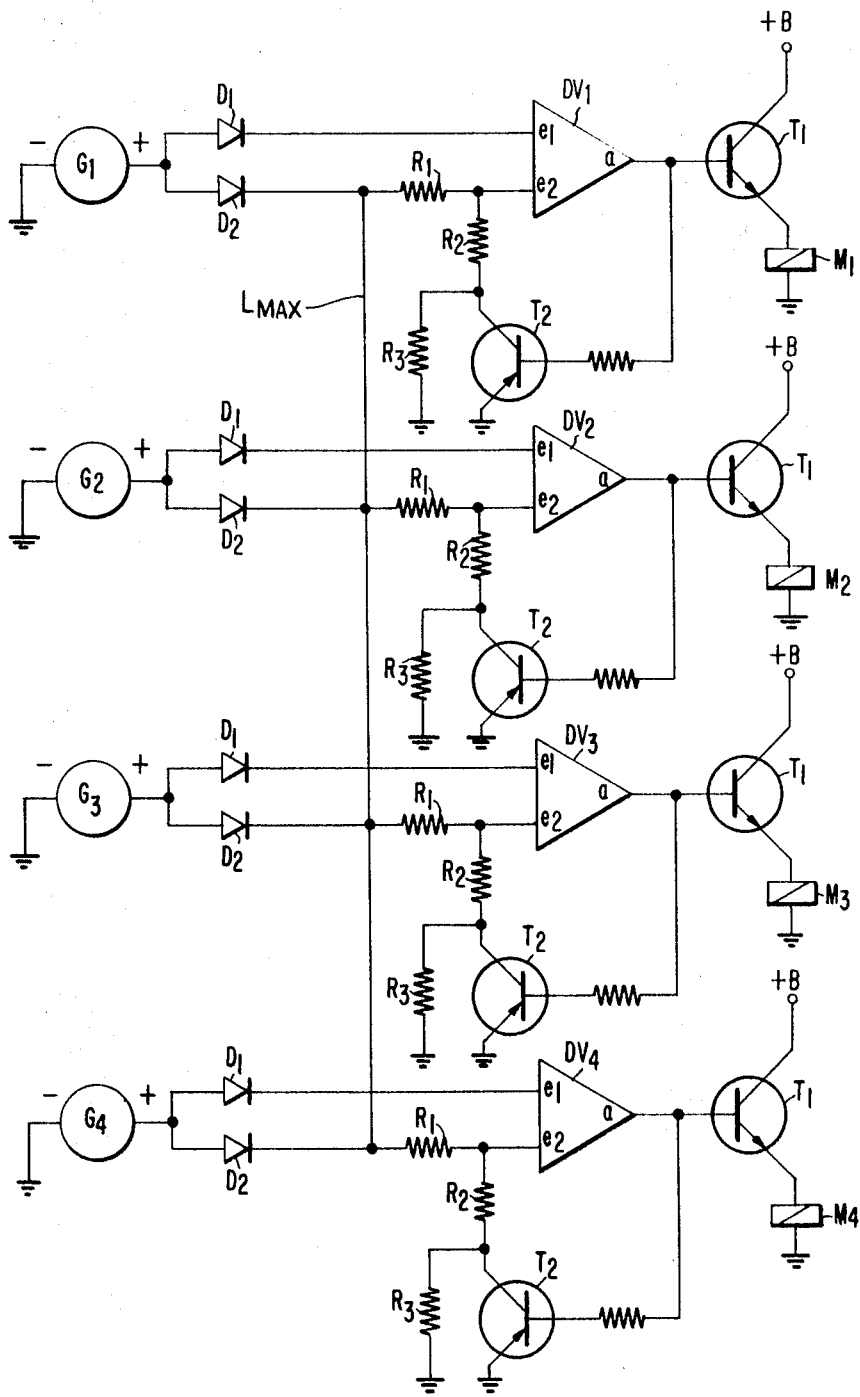
FIG. 1 is a circuit diagram of a control installation in accordance with the present invention which possesses a hysteresis.

Referring now to the drawing wherein like reference characters are used throughout the various views to designate like parts, and more particularly to FIG. 1, this Figure illustrates the principle of a control installation for the blocking prevention in accordance with the present invention.

The four wheels of the vehicle drive each a respective generator $G_1$ to $G_4$. The output voltages of the generators are conducted by way of one diode $D_2$ each to a common maximum voltage line $L_{max}$. The diodes $D_2$ are so connected that the voltage of the most rapidly rotating generator, i.e., also the voltage of the wheel rotating the fastest, prevails in the maximum voltage line $L_{max}$.

All four generators must have the same speed characteristics.

The voltage at the maximum voltage line $L_{max}$ represents tee comparison voltage. It is transmitted to four comparison circuits. One comparison circuit is provided for each wheel.

The voltage of a respective generator is supplied directly to the corresponding comparison circuit by way of a respective diode $D_1$. Since the comparison circuit is to respond with a predetermined value of the slippage $s_1$ (for example, 15 percent), the comparison voltage has to be divided in the ration of the slippage value $s_1$. This is realized by a voltage divider which initially consists of the resistances $R_1$ and $R_2$ since the transistor $T_2$, as will be described more fully hereinafter, is initially conducting. The conditions for the resistance ratio are as follows:

$$\frac{R_2}{R_1+R_2}=1-\frac{s_1}{100}$$

Consequently, to each comparison circuit is applied, on the one hand, a voltage which is proportional to the corresponding wheel rotational speed and, on the other, the voltage of the wheel rotating the fastest which is subdivided in the ratio of $$1:\left(1-\frac{s_1}{100}\right).$$

The comparison circuit includes a conventional differential amplifier DV with as great as possible an amplification. An operational amplifier of known, conventional construction is appropriately utilized. Such an amplifier responds, as is known, to the difference of two voltages. If the voltage at the input $e_1$ is larger (positive) than at the input $e_2$, then the voltage in the output $a$ of the utilized differential amplifier DV is negative. By reason of the very great amplification, a voltage difference of a few mv. is sufficient in order to control the amplifier completely up to its limits, i.e., up to cutoff and saturation.

Applied to the circuit of FIG. 1, this means that when all wheels rotate equally fast, i.e., all the generators $G_1$—$G_4$ produce the same voltage, the voltage at the input $e_1$ is larger at all differential amplifiers DV than at the input $e_2$ and therewith all outputs $a$ are negative. The transistor $T_2$ is a PNP type transistor of conventional construction. Its base is controlled by the output $a$. In the described condition, the transistor $T_2$ is therefore conductive and therewith short circuits the resistance $R_3$. Consequently, the voltage divider initially consists only of the resistances $R_1$ and $R_2$.

The bases of the transistors $T_1$ which are conventional NPN type transistors, are also connected to the corresponding output $a$. The transistors $T_1$ are therefore all nonconductive and therewith none of the magnetic valves $M_1$—$M_4$ is actuated.

During braking, the wheel 1 and therewith the generator $G_1$ is assumed to rotate more slowly than the remaining wheels. If the slippage $s_1$ is exceeded, then the voltage in the input $e_1$ at the differential amplifier $DV_1$ is smaller than at the input $e_2$ and therewith the output $a$ becomes positive. The transistor $T_1$ becomes conductive and the magnetic valve $M_1$ is actuated.

The magnetic valve is conventionally connected in the brake line and upon being controlled, renders inoperative or ineffective the brake of the corresponding wheel. Simultaneously, the transistor $T_2$ is blocked, i.e., rendered nonconductive and therewith the resistance $R_3$ is connected into the voltage divider. Consequently, the following equation is now valid:

$$\frac{R_2+R_3}{R_1+R_2+R_3}=1-\frac{s_2}{100}$$

where $s_2$ represents a smaller slippage (for example 5 percent) than $s_1$.

By reason of the fact that no brake effect exists any longer at the wheel 1, the latter is again accelerated, i.e., the slippage with respect to the other wheel again becomes smaller.

The condition at the comparison circuit and at the magnetic valve, however, remains for such length of time until the slippage value $s_2$ is reached of the slippage falls below the value $s_2$. The comparison circuit then flips over again into its initial condition, the magnetic valve $M_1$ is no longer actuated and the circuit can respond again only with a slippage value $s_1$.

The introduction of this hysteresis in response between $s_1$ and $s_2$ precludes that the entire system starts to oscillate or hunt about the slippage value $s_1$. Such a hysteresis can also be achieved in that a second voltage divider is connected in the line from the generator to the comparison circuit which is connected in and out of the circuit by means of a transistor, in this case, by an NPN type transistor. The voltage divider then remains always constant in its ratio from the common point to the comparison device.

Certain requirements must be made of the generators. They must all possess exactly the same speed characteristics. They must operate as inertialess as possible, i.e., their dead time during speed changes should be very small (approximately 1 ms.). In order that they can be accommodated under certain circumstances in proximity to the brakes, they must also be able to withstand higher temperatures and must not be affected by a temperature change. Furthermore, it is desirable that they can be monitored in the function thereof, i.e., that during failure of a generator, the entire blocking prevention circuit is turned off and this fact is indicated by an alarm signal.

DC machines come to mind at first as DC generators which may have the form of a homopolar generator or of a commutator-type generator. Both operate with sliprings which are not very reliable and additionally are subject to wear. Furthermore, the internal resistance thereof and the magnetic flux in the machine is dependent on the temperature so that with an unequal warming up of these generators, differences in the output voltages are present with the same rotational speed.

These disadvantages of the DC generators can be prevented with appropriate measures so that they can be conditionally considered for use in the blocking prevention circuit of the present invention.

If one utilizes AC generators with permanent magnets, the slip rings can be dispensed with. The signal of such a multipole AC generator is then rectified and filtered so that a voltage is available proportional to the rotational speed.

Disadvantageous with such AC generator is again the effect of temperature on the machine and the very high accuracy requirements for the manufacture in order to obtain the same characteristics for may generators.

Most suitable are frequency generators which in principle are AC generators with a very large number of poles. However, not the magnitude of the output voltage, but rather the frequency thereof is then utilized. This frequency is very closely proportional to the rotational speed.

The output voltage of these types of generators is fed to a so-called frequency-voltage converter of conventional construction in which pulses of same energy content are produced proportional to the frequency of the generator. The pulse recurrence frequency is therefore again proportional to the rotational speed. The average value of the pulse recurrence frequence is obtained in a low-pass filter so that an output voltage proportional to the rotational speed is available.

The boundary frequency or limit frequency of the low-pass filter is determined by the aforementioned dead time. The number of pulses per wheel rotation for the frequency transmitter is determined by the steepness of the slope of the curve of the low-pass filter and by the lowest rotational speed at which the blocking prevention installation is still to function.

The thus-obtained voltage proportional to rotational speed is no longer dependent on the temperature of the generator.

Figure 2:
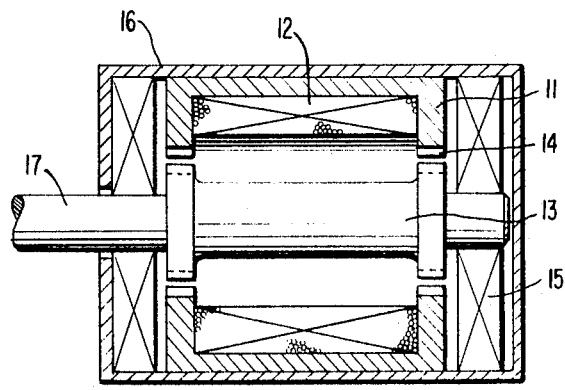
FIG. 2 is a longitudinal cross-sectional view through a generator in accordance with the present invention for use in the circuit of FIG. 1.

A frequency generator of the last-described type is illustrated in FIG. 2. It comprises a stator 11 of magnetic material (which may also be laminated), which carries a winding 12. A rotor 13, also of magnetic material, closes the magnetic circuit. The stator 11 and the rotor 13 each carry a toothed arrangement so that during rotation a change in airgap occurs, depending on whether a tooth is opposite a tooth or a tooth is opposite a gap.

This air gap change produces subsequently an induction change of the generator. The product of the number of teeth and of the rotational speed produces the output frequency of the generator. Bearings 15 retain the rotor 13 in a housing 16. A drive shaft 17 is connected with a vehicle wheel.

Figure 4:
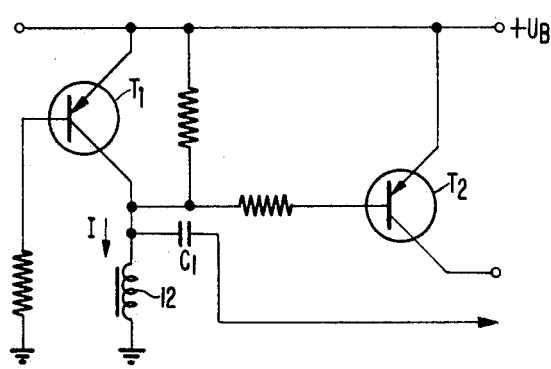
FIG. 4 is a schematic diagram of a circuit for monitoring the operating safety in accordance with the present invention.

The winding 12 of the generator is traversed by an impressed current. This is achieved either by a series connection of a corresponding resistance or preferably by the connection of the winding 12 in the collector circuit of a transistor (FIG. 4).

If the air gap in the generator now changes, then its inductivity changes and therewith the voltage at the coil 12.

This AC voltage is supplied to the frequency-voltage converter. The DC voltage in the winding 12 is separated out by a condenser $C_1$.

The generator can be monitored with the aid of the DC current continuously flowing through the winding 12.

A corresponding circuit is illustrated in FIG. 4. An interruption in the feedline or in the winding 12 effects that no current $I$ flows any longer and the voltage at the transistor $T^1$ rises nearly to the value $+U_B$. As a result thereof, the transistor $T_2$ is blocked or rendered nonconductive which prior thereto was conductive. The signal at the collector of the transistor $T_2$ can now be utilized in order to render inoperable either the entire blocking prevention circuit or only the magnetic valve belonging to the corresponding wheel.

The arrangement described so far does not respond when all four wheels reach the same slippage, i.e., if all four wheels are caused to slip by the same amount at the same time. For that case, provision is made in accordance with the present invention so that an additional installation disconnects or renders ineffective the brake effect at all wheels.

If a braked wheel loses its frictional engagement, then a greater slippage occurs very rapidly, i.e., from a change in slippage one can also conclude the beginning of blocking of a wheel. The change in slippage can be determined from the rotational speed progress of a wheel by differentiation.

Figure 3:
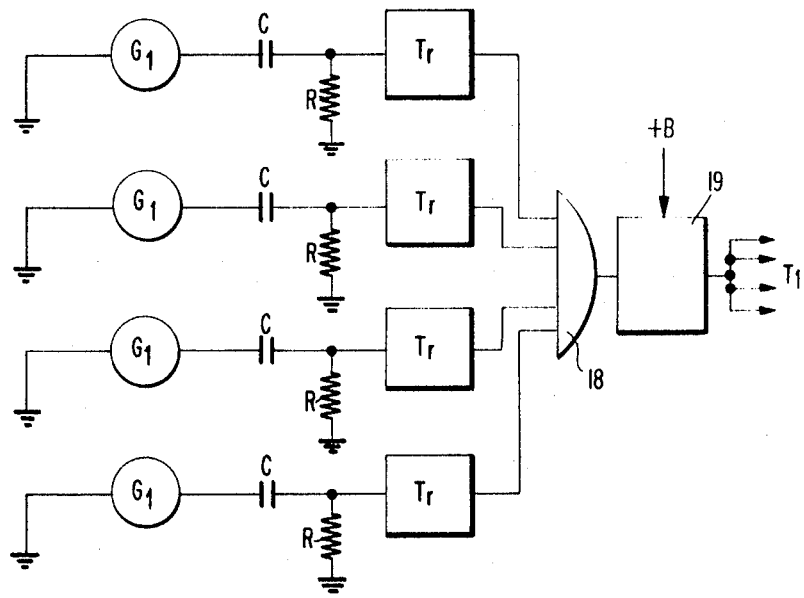
FIG. 3 is a schematic diagram of a circuit in accordance with the present invention for the indication of a blocking of all four wheels.

In the circuit according to FIG. 3, the output voltage of each generator is differentiated in a conventional CR circuit and is subsequently supplied to a conventional trigger device. If the voltage at the trigger Tr reaches now a predetermined value, which occurs only when a wheel commences to block, then the trigger device responds and produces a signal in a conventional manner. The outputs of all triggers are connected with an AND device 18 of conventional construction. This AND device 18 produces a signal when all triggers Tr have responded. The output of the AND device 18 is connected with an electronic switch 19 of conventional construction which is connected, for example, with all the bases of the transistors $T_1$ of the blocking-prevention circuit of FIG. 1 by way of conventional diodes (not shown).

If all four wheels start to slip, then all four trigger devices Tr respond and the electronic switch 19 actuates all four magnet valves by way of the transistors $T_1$. As a result thereof the wheels are freed or disconnected from the brakes and can again come into frictional contact with the road.

The trigger device naturally possesses a hysteresis, realized in a conventional manner in order that a reacceleration of the wheels can be achieved.

The comparison of the velocity of the wheels with the velocity of the vehicle offers another possibility. This comparison could be carried out in principle in order to determine whether a wheel in fact has a slippage.

The velocity of the vehicle can be determined, for example, by means of an unbraked fifth wheel at the vehicle. For measuring purposes, such wheels are frequently used. The installation of such a wheel does not represent any difficulties from a technical point of view. The unbraked wheel is now also provided with a generator $G_s$ (not shown). The output signal of this generator $G_s$ now serves as reference voltage and in the circuit according to FIG. 1, replaces the maximum voltage line illustrated therein.

In lieu of the fifth wheel, one can also utilize other conventional means. In that connection, reference is made to the doppler effect with radar, ultrasonic or laser rays or the integration of output voltages of an acceleration transmitter can be used which latter is so installed and constructed that it does not respond to inclinations in the road.

Figure 5:
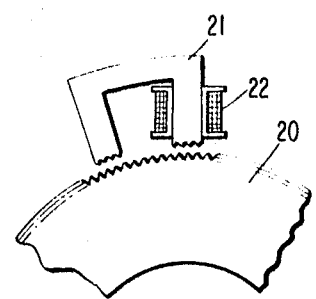
FIG. 5 is a partial schematic view of a modified embodiment of a generator in accordance with the present invention.

Instead of the generators provided in the manner described in connection with FIG. 2, also a generator can be used which does not require any special parts, in which rather the parts present already at the brake and at the wheel are utilized in order to produce the pulses as illustrated in FIG. 5. In this Figure, the brake disc 20 is provided with teeth according to the same principle as in FIG. 2. For the detection purpose, a pole shoe 21 is used which carries the same teeth. This pole shoe is energized by way of the winding 22.

While we have shown and described several embodiments in accordance with the present invention, it is understood that the same is not limited thereto but is susceptible of numerous changes and modifications as known to a person skilled in the art, and we therefore do not wish to be limited to the details shown and described but intend to cover all such changes and modifications as are within the scope of those skilled in the art.

We claim:

1. An installation for the control of valves which are connected in the brake lines of a motor vehicle, and which includes generator means driven by the respective wheels and producing output signals corresponding to the rotational speed of the wheels, amplifier means for each wheel, and rectifier means connected between the generator means and the amplifier means associated with a corresponding wheel, characterized in that each generator means is connected with one input of a differential amplifier means by way of a rectifier means, each generator means being operatively connected with a voltage indicative of a speed of the vehicle by way of another rectifier means, a voltage divider having a tap connected with the other input of the differential amplifier means, one side of the voltage divider being connected with said voltage and the other side thereof with a reference potential, and switch means for said valves controlled by the differential amplifier means and connected between said tap and the reference potential.

2. An installation according to claim 1, wherein said voltage is the voltage applied to a maximum voltage line from the generator means rotating the fastest.

3. An installation according to claim 2, wherein said generator means operate by appropriately shaped portions present in at least one of the two parts consisting of wheel and brake.

4. An installation according to claim 3, wherein said generator means are frequency generators having a frequency-voltage converter means connected in the output thereof.

5. An installation according to claim 4, characterized in that each generator means is operatively connected with a slip-change measuring means, all slip-change measuring means being connected with an AND circuit means, and the output of the AND circuit means being operatively connected with magnetic valves.

6. An installation according to claim 5, characterized in that means are provided as slip-change measuring means comparing the true vehicle speed with the wheel rotational speed.

7. An installation according to claim 6, wherein said last-mentioned means includes doppler effect measuring means.

8. An installation according to claim 7, characterized by monitoring means monitoring an interruption of short circuit in a line in or leading to a generator means which includes means for monitoring the energizing current for the switch means to turn off the blocking prevention effect of the installation in case of such interruption or short circuit.

9. An installation according to claim 1, wherein said generator means operate by appropriately shaped portions present in at least one of the two parts consisting of wheel and brake.

10. An installation according to claim 1, wherein said generator means are frequency generators having a frequency-voltage converter means connected in the output thereof.

11. An installation according to claim 1, characterized in that each generator means is operatively connected with a slip-change measuring means, all slip-change measuring means being connected with an AND circuit means, and the output of the AND circuit means being operatively connected with magnetic valves.

12. An installation according to claim 11, characterized in that means are provided as slip-change measuring means comparing the true vehicle speed with the wheel rotational speed.

13. An installation according to claim 12, wherein said last-mentioned means includes doppler effect measuring means.

14. An installation according to claim 13, characterized by monitoring means monitoring an interruption or short circuit in a line in or leading to a generator means which includes means for monitoring the energizing current for the switch means to turn off the blocking prevention effect of the installation in case of such interruption or short circuit.

15. An installation according to claim 1, characterized by monitoring means monitoring an interruption or short circuit in a line in or leading to a generator means which includes means for monitoring the energizing current for the switch means to turn off the blocking prevention effect of the installation in case of such interruption or short circuit.

16. An installation for the control of valves in the brake lines of a motor vehicle, which includes generator means driven by the respective wheels and producing an output signal corresponding to rotational speed of the corresponding wheel, each generator means being connected with a control means for controlling the respective valve comprising first means for actuating the respective valve in a closing direction to render the brake at the corresponding wheel ineffective and second means for opening again a respective valve, said first means responding at a predetermined first value of slippage and the second means overriding the control effect of the first means only when said slippage has reached a second predetermined value that is lower than said first value, characterized in that each generator means is operatively connected with a slip-change measuring means, all slip-change measuring means being connected with an AND circuit means, and the output of the AND circuit means being operatively connected with the values.

17. An installation for the control of valves in the brake lines of a motor vehicle, which includes generator means driven by the respective wheels and producing an output signal corresponding to the rotational speed of the corresponding wheel, each generator being connected with a control means for controlling the respective valve comprising first means for actuating the respective valve in a closing direction to render the brake at the corresponding wheel ineffective and second means for opening again a respective valve, said first means responding at a predetermined first value of slippage and the second means overriding the control effect of the first means only when said slippage has reached a second predetermined value that is lower than said first value, characterized by monitoring means monitoring an interruption or short circuit in the installation and operable to render inoperable the blocking prevention effect of the installation in case of such interruption or short circuit.